June 24, 1958 LA VERNE B. RAGSDALE 2,840,139
SINGLE TRACK SEAT ADJUSTER
Filed April 20, 1955 2 Sheets-Sheet 1

Inventor
LaVerne B. Ragsdale
By Paul Fitzpatrick
Attorney

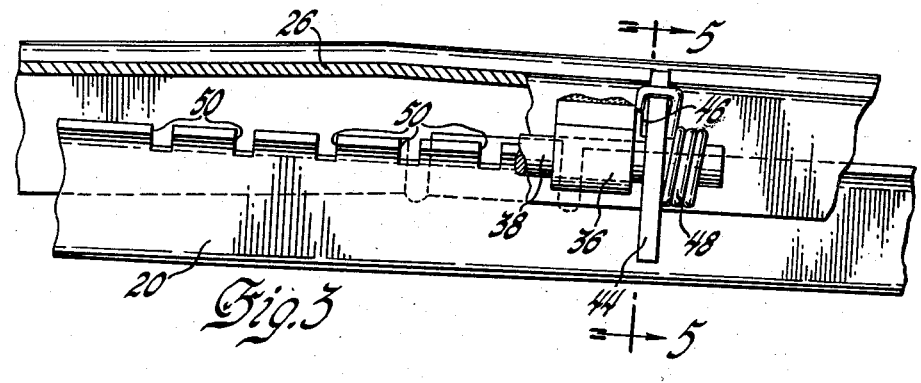
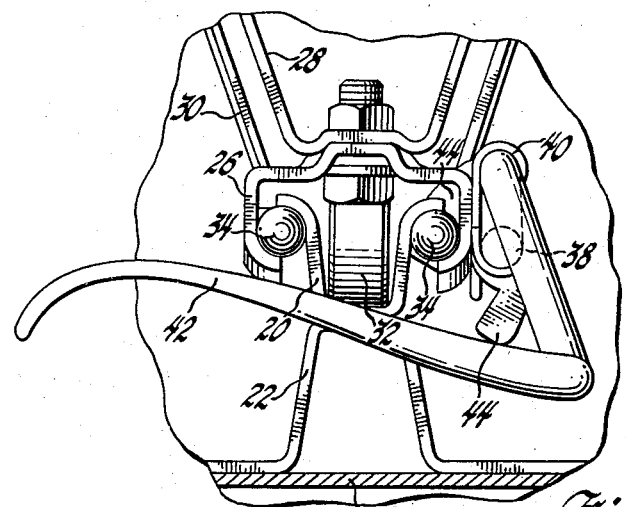
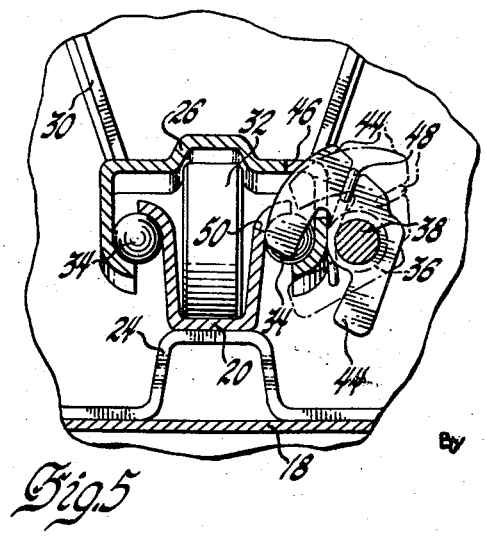
Inventor
LaVerne B. Ragsdale
Paul Fitzpatrick
Attorney

United States Patent Office 2,840,139
Patented June 24, 1958

2,840,139

SINGLE TRACK SEAT ADJUSTER

La Verne B. Ragsdale, Dearborn, Mich., assignor to General Motors Corporation, Detroit, Mich., a corporation of Delaware Application April 20, 1955, Serial No. 502,691

8 Claims. (Cl. 155—14)

This invention relates to a seat adjuster, and more particularly to an improved seat adjuster for a single passenger automobile seat.

One feature of the invention is that it provides an improved seat adjuster; another feature of the invention is that it provides a novel seat adjuster having a single longitudinal adjustment track structure located adjacent the transverse center of the seat and a sway bar extending transversely of the seat to prevent pivoting of the seat frame around the track structure; a further feature of the invention is that the load is distributed between the adjustment means and the sway bar, since the adjustment means is connected to the seat frame at the front and rear of the frame adjacent the transverse center thereof and the sway bar is connected to opposite sides of the frame adjacent the longitudinal center thereof.

Other features and advantages of the invention will be apparent from the following description and from the drawings, in which:

Fig. 3 is an enlarged detail view, partly in section, showing the latch means for the longitudinal adjuster;

Fig. 4 is an enlarged detail view taken along the line 4—4 of Fig. 1; and

Fig. 5 is a transverse section through the longitudinal adjuster taken along the line 5—5 of Fig. 3, the parts being shown in sold lines in latched position and in broken lines in latch released position.

Conventional types of seat adjusters used in automobiles include longitudinal adjustment tracks at opposite sides of the seat, these tracks often being connected together by a torsion bar extending across the seat adjacent the rear edge thereof. Utilizing a single adjustment track structure adjacent the transverse center of the seat reduces the cost of the seat adjuster mechanism and also reduces the possibilities of binding in the operation of the seat adjuster. However, heretofore single centrally disposed tracks have not been entirely satisfactory because of a tendency of the seat to pivot around the centrally disposed track. Attempts have been made to correct this by providing a sway bar at the rear edge of the seat, but with this arrangement the vertical load on the seat was unevenly distributed between the adjuster and the sway bar.

This invention provides a novel seat adjuster in which the adjustment means includes a single track structure adjacent the transverse center of the seat and a sway bar extending transversely of the seat adjacent the longitudinal center thereof, the bar being connected to the seat frame and to the vehicle floor or other fixed support. Using only a single centrally located track structure reduces the cost and lessens any tendency of the adjuster to bind or jamb, and providing a centrally disposed sway bar prevents the seat from pivoting about the track structure and provides means for distributing part of the vertical load to opposite sides of the seat.

Figure 1:
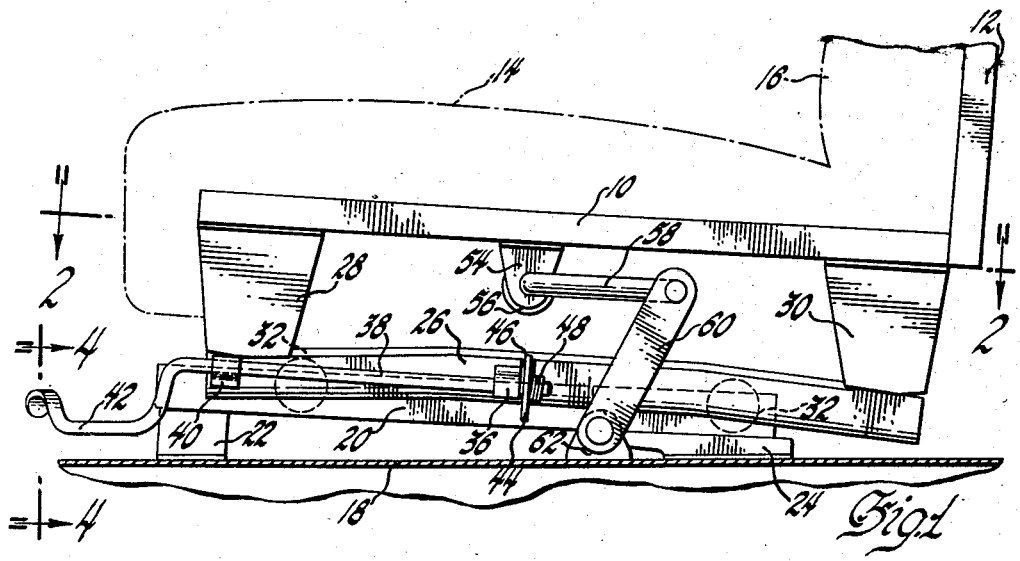
Fig. 1 is a side elevational view of a seat including the improved seat adjuster, the seat cushion and a portion of the seat back being shown in broken lines.
Figure 2:
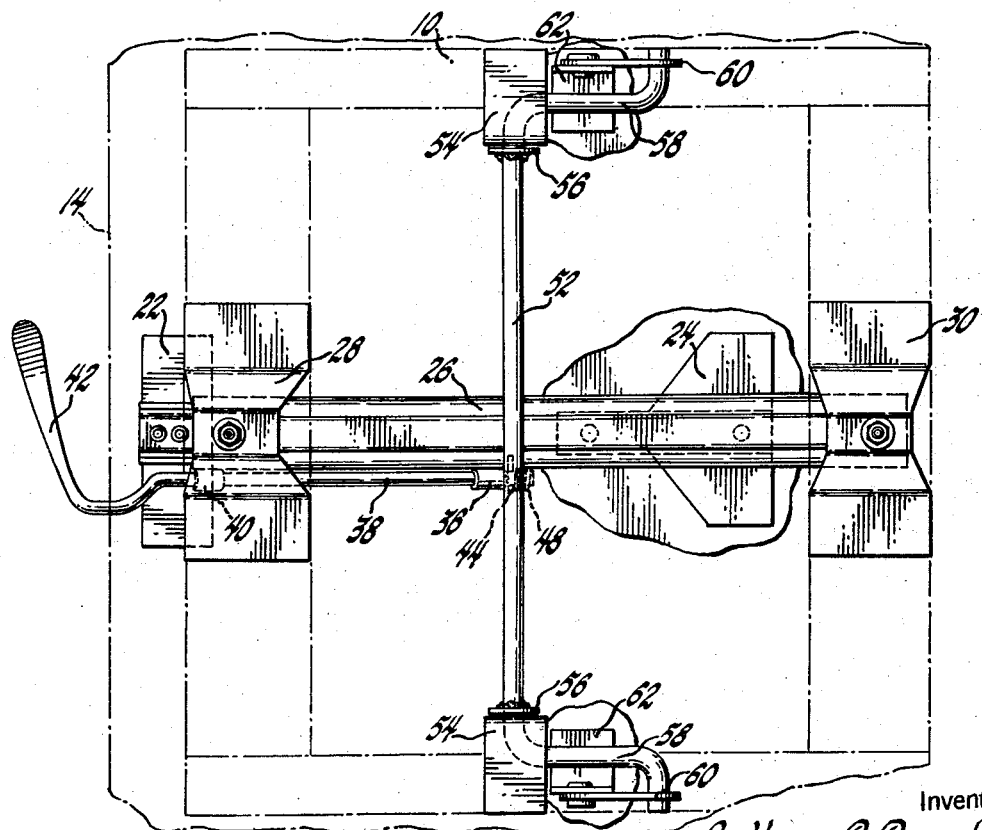
Fig. 2 is a horizontal section taken along the line 2—2 of Fig. 1.

Referring now more particularly to the drawings, Figs. 1 and 2 show a single passenger seat which may be of the so-called "bucket" type, having a frame 10 with a back portion 12. A seat cushion 14 and a seat back 16 are mounted on the frame, and the frame is supported for longitudinal adjustment on a single, centrally disposed adjacent means.

The floor 18 of the automobile forms a fixed support upon which a stationary track 20 is mounted by means of a front support bracket 22 and a rear support bracket 24. As shown in Fig. 2, the track 20 extends longitudinally of the seat frame adjacent the transverse center thereof. A movable track 26 is slidably mounted on the stationary track and is connected to the seat frame at the front and rear of the frame through a front bracket 28 depending from the frame and a similar rear bracket 30.

The construction of the tracks 20 and 26 and the means for facilitating sliding movement between the tracks is conventional and is well known in the art. Between the tracks and near each end thereof there is a roller 32 for bearing the bulk of the vertical load, and near each end of the tracks there are anti-friction balls 34 carried in races formed by complementary bent flanges on the stationary and slidable track members.

Latch means are provided for holding the slidable track at a selected location along the stationary track. A bearing bracket 36 is welded to the slidable track 26 near the longitudinal center of one side thereof to provide a rotatable support for a handle shaft 38 which extends forwardly of the tracks through a second bearing bracket 40. At the front of the seat the shaft 38 is bent to form an operating handle 42. A latch lug 44 is rigidly mounted on the shaft 38 at the rear end thereof. This lug projects through a slot 46 in the side of the track 26 and is urged into engagement with the stationary track 20 by a coil spring 48 mounted on the shaft 38.

As shown in Figs. 3 and 5, a plurality of notches 50 are formed in the side flange of the stationary track 20 and the latch lug 44 engages a selected one of these notches to hold the tracks 20 and 26 against relative movement. When it is desired to adjust the position of the seat longitudinally, the handle 42 is manipulated to rotate the shaft 38 in a clockwise direction (Fig. 5) to retract the lug 44 from the notch 50 as shown in broken lines in Fig. 5. With the parts in this position, the seat can be adjusted forward or backward to a desired location, and upon release of the handle 42, the lug 44 will enter another one of the notches 50 when the lug becomes aligned with this other notch. A spring (not shown) may be utilized in conventional manner to facilitate forward movement of the seat.

In order to prevent the seat from pivoting around the centrally disposed single adjustment track, a sway bar 52 is connected between the seat frame and the fixed support or floor 18. As shown in Figs. 1 and 2, the sway bar extends transversely of the seat frame adjacent the longitudinal center thereof. This location of the bar distributes the vertical load between the sway bar and the longitudinal adjuster and tends to provide an equalized four-point distribution of the vertical load. The sway bar is connected to opposite sides of the seat frame by means of brackets 54 which depend from the seat frame at opposite sides thereof and which have aligned openings rotatably receiving the sway bar. Adjacent each of the brackets 54 a collar 56 is welded to the sway bar to prevent the bar from moving in directions transverse of the seat. At each end the sway bar is bent at a right angle to form crank portions 58, each crank portion extending rearwardly of the seat and being pivotally connected at its free end to a link 60. Each link is pivotally connected to a bracket 62 mounted on the floor 18. The linkage connection formed by the crank portions 58 of the sway bar and the links 60 permit fore and aft adjustment of the seat without jamming the sway bar.

While I have shown and described one embodiment of my invention, it is capable of many modifications. Changes, therefore, in the construction and arrangement may be made without departing from the spirit and scope of the invention as set forth in the appended claims.

I claim:

1. A seat adjuster of the character described, comprising: a seat frame; adjustment means for moving the seat frame longitudinally, said means including only a single track structure mounted on a fixed support and connected to the seat frame adjacent the transverse center thereof; a sway bar extending transversely of the seat frame adjacent the longitudinal center thereof, said bar being pivotally connected to said frame adjacent opposite sides thereof and having a crank portion at each end extending at a right angle to the central body portion of the sway bar; and a link at each side of the seat frame, each link being pivotally connected to a crank portion of the sway bar and to said fixed support, the sway bar preventing pivoting of the seat frame around the longitudinal axis of the adjustment means.

2. A seat adjuster of the character described, comprising: a seat frame; adjustment means for moving the seat frame longitudinally, said means including only a single track structure mounted on a fixed support and comprising a stationary track connected to the fixed support and a movable track slidably mounted on the stationary track and connected to the seat frame adjacent the transverse center thereof; anti-friction means between said tracks; latch means movably mounted on one track and engageable with the other track for holding the seat frame in a selected longitudinal position; a sway bar extending transversely of the seat frame adjacent the longitudinal center thereof, said bar being pivotally connected to said frame at opposite sides thereof and having a crank portion at each end extending at a right angle to the central body portion of the sway bar; and a link at each side of the seat frame, each link being pivotally connected to a crank portion of the sway bar and to said fixed support, the sway bar preventing pivoting of the seat frame around the longitudinal axis of the adjustment means.

3. A seat adjuster of the character described, comprising: a seat frame; adjustment means for moving the seat frame longitudinally, said means including a single track structure mounted on a fixed support and connected to the seat frame adjacent the transverse center thereof; and a sway bar extending transversely of the seat frame adjacent the longitudinal center thereof, said bar being connected to said frame adjacent opposite sides thereof and being connected through link means to said fixed support at opposite sides of the seat frame to prevent pivoting of the seat frame around the adjustment means, the single track and the sway bar and link means comprising the sole support for the seat frame.

4. A seat adjuster of the character described, comprising: a seat frame; adjustment means for moving the seat frame longitudinally, said means including a single track structure mounted on a fixed support and connected to the seat frame at the front and rear of the frame adjacent the transverse center thereof; and a sway bar extending transversely of the seat frame adjacent the longitudinal center thereof, said bar being connected to said frame adjacent opposite sides thereof and being connected through link means to said fixed support at opposite sides of the seat frame to prevent pivoting of the seat frame around the adjustment means, the single track and the sway bar and link means comprising the sole support for the seat frame.

5. A seat adjuster of the character described, comprising: a seat frame; adjustment means for moving the seat frame longitudinally, said means including a single track structure mounted on a fixed support and connected to the seat frame at the front and rear of the frame adjacent the transverse center thereof; latch means on the adjustment means for holding the seat frame in a selected longitudinal position; and a sway bar extending transversely of the seat frame adjacent the longitudinal center thereof, said bar being connected to said frame adjacent opposite sides thereof and being connected through link means to said fixed support at opposite sides of the seat frame to prevent pivoting of the seat frame around the adjustment means, the single track and the sway bar and link means comprising the sole support for the seat frame.

6. A seat adjuster of the character described, comprising: a seat frame; adjustment means for moving the seat frame longitudinally, said means including a single track structure mounted on a fixed support and connected to the seat frame adjacent the transverse center thereof; and a sway bar extending transversely of the seat frame adjacent the longitudinal center thereof, said bar being connected through link means to said frame adjacent opposite sides thereof and said bar having a crank portion at each end pivotally connected to said fixed support at opposite sides of the seat frame to prevent pivoting of the seat frame around the adjustment means, the single track and the sway bar and link means comprising the sole support for the seat frame.

7. A seat adjuster of the character described, comprising: a seat frame; adjustment means for moving the seat frame longitudinally, said means including a single track structure comprising a stationary track connected to a fixed support and a movable track slidably mounted on the stationary track and connected to the seat frame adjacent the transverse center thereof; anti-friction means between said tracks; and a sway bar extending transversely of the seat frame adjacent the longitudinal center thereof, said bar being connected to said frame adjacent opposite sides thereof and being connected to said fixed support through link means at opposite sides of the seat frame to prevent pivoting of the seat frame around the adjustment means, the single track and the sway bar comprising the sole support for the seat frame.

8. A seat adjuster of the character described, comprising: a seat frame; adjustment means for moving the seat frame longitudinally, said means including a single track structure comprising a stationary track connected to a fixed support and a movable track slidably mounted on the stationary track and connected to the seat frame adjacent the transverse center thereof; anti-friction means between said tracks; and a sway bar extending transversely of the seat frame adjacent the longitudinal center thereof, said bar being pivotally connected to said frame adjacent opposite sides thereof and said bar having a crank portion at each end pivotally connected through link means to said fixed support at opposite sides of the seat frame to prevent pivoting of the seat frame around the adjustment means, the single track and the sway bar and link means comprising the sole support for the seat frame.

References Cited in the file of this patent

UNITED STATES PATENTS

| 2,129,952 | Lustig | Sept. 13, 1938 |
| 2,195,507 | Best | Apr. 2, 1940 |
| 2,702,582 | Potter | Feb. 22, 1955 |

FOREIGN PATENTS

| 1,308 | Australia | Apr. 6, 1926 |

UNITED STATES PATENT OFFICE
CERTIFICATE OF CORRECTION

Patent No. 2,840,139                                                                June 24, 1958

La Verne B. Ragsdale

It is hereby certified that error appears in the printed specification of the above numbered patent requiring correction and that the said Letters Patent should read as corrected below.

Column 1, line 45, for "sold" read -- solid --; column 2, line 7, for '"bucket'.' read -- "bucket" --; line 10, for "adjacent" read -- adjustment --.

Signed and sealed this 23rd day of September 1958.

(SEAL)
Attest:

KARL H. AXLINE                                                      ROBERT C. WATSON

Attesting Officer                                                Commissioner of Patents